(12) United States Patent
Sakazawa et al.

(10) Patent No.: US 7,627,135 B2
(45) Date of Patent: Dec. 1, 2009

(54) DIGITAL WATERMARKING SYSTEM AND DRIFT COMPENSATING SYSTEM

(75) Inventors: Shigeyuki Sakazawa, Saitama (JP); Yasuhiro Takishima, Saitama (JP)

(73) Assignee: KDDI Corporation, Tokyo (JP)

( * ) Notice: Subject to any disclaimer, the term of this patent is extended or adjusted under 35 U.S.C. 154(b) by 690 days.

(21) Appl. No.: 10/979,121

(22) Filed: Nov. 3, 2004

(65) Prior Publication Data

US 2005/0100190 A1     May 12, 2005

(30) Foreign Application Priority Data

Nov. 7, 2003    (JP)   ............... 2003-378203

(51) Int. Cl.
*G06K 9/00*     (2006.01)
(52) U.S. Cl. ............... 382/100; 375/240.18; 394/152; 364/514
(58) Field of Classification Search ............... 382/100, 382/232
See application file for complete search history.

(56) References Cited

U.S. PATENT DOCUMENTS

| | | | | |
|---|---|---|---|---|
| 5,317,685 | A * | 5/1994 | Morimura et al. | 345/474 |
| 5,337,087 | A * | 8/1994 | Mishima | 375/240.04 |
| 5,684,714 | A * | 11/1997 | Yogeshwar et al. | 370/521 |
| 6,259,801 | B1 * | 7/2001 | Wakasu | 382/100 |
| 6,278,792 | B1 * | 8/2001 | Cox et al. | 382/100 |
| 6,453,053 | B1 | 9/2002 | Wakasu | |
| 6,522,767 | B1 * | 2/2003 | Moskowitz et al. | 382/100 |
| 6,553,070 | B2 * | 4/2003 | Hashimoto | 375/240.18 |
| 6,606,393 | B1 * | 8/2003 | Xie et al. | 382/100 |
| 6,735,325 | B2 | 5/2004 | Wakasu | |
| 6,879,703 | B2 * | 4/2005 | Lin et al. | 382/100 |

FOREIGN PATENT DOCUMENTS

| | | |
|---|---|---|
| JP | 10-191330 A | 7/1998 |
| JP | 2002-135737 | 5/2002 |

OTHER PUBLICATIONS

F. Hartung and M. Kutter, "Multimedia Watermarking Techniques", Proceedings of the IEEE, vol. 87, No. 7, pp. 1079-1107, Jul. 1999.
Japanese Office Action dated May 21, 2008, Application No. 2003-378203.
S. Sakazawa, et al., "A Note on Watermark Embedding into MPEG Stream" Proceedings of the 2003 IEICE General Conference, Mar. 2003, p. 35 ( D-11-35).

* cited by examiner

*Primary Examiner*—Samir A. Ahmed
*Assistant Examiner*—Tsung-Yin Tsai
(74) *Attorney, Agent, or Firm*—Westerman, Hattori, Daniels & Adrian, LLP

(57) ABSTRACT

An object of the present invention is to perform DCT coefficient operation and drift compensation for embedding watermark data with the small amount of computing. An MB data extraction unit extracts a macro block or block into which the watermark data is embedded on the basis of a template. Additionally, a DCT coefficient extraction unit extracts the DCT coefficient at a position into which the watermark data is embedded according to a direction of the template. A DCT coefficient operation unit performs the process of embedding the watermark data or the process of compensating the drift to the extracted DCT coefficient.

6 Claims, 4 Drawing Sheets

Fig. 5A  Fig. 5B  Fig. 5C
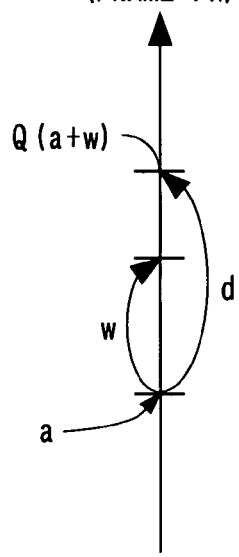
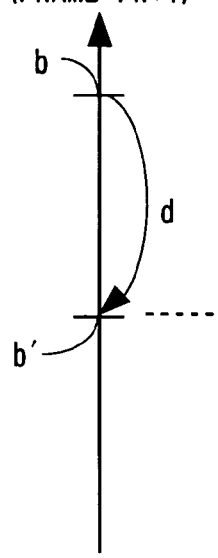
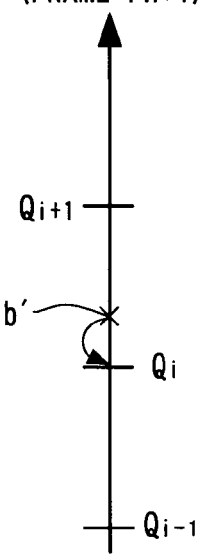
Fig. 6
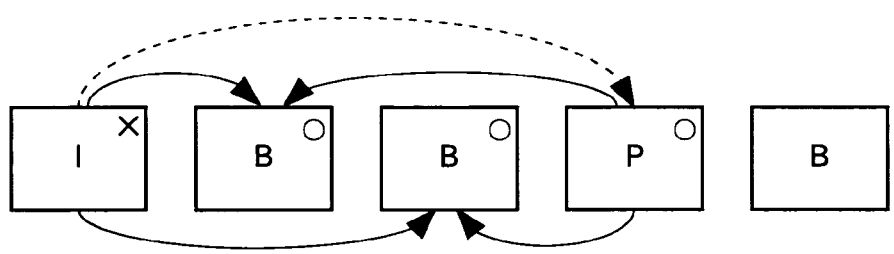
× ··· WATERMARKING PROCESS
○ ··· DRIFT COMPENSATING PROCESS

DIGITAL WATERMARKING SYSTEM AND DRIFT COMPENSATING SYSTEM

BACKGROUND OF THE INVENTION

1. Field of the Invention

The present invention relates to a digital watermarking system and a drift compensating system for enabling existence of copyright to be verified by watermarking a motion picture in delivering the motion picture and for enabling a source of a pirated edition to be decided by changing watermarked information in each destination.

2. Description of the Related Art

Most of the related arts are the systems of watermarking a baseband signal (non-compressed motion picture). For example, the system is disclosed in Japanese Patent Laid-Open Publication No. 2002-135737.

On the other hand, the system of directly watermarking a MPEG stream which is of the compressed motion picture is preferable because the amount of computing is largely decreased. However, a mismatch (drift) between encoded data and decoded data is generated, so that there is a problem that leads to degradation in image quality.

Therefore, in directly watermarking the MPEG stream, the drift compensating system has been proposed (F. Hartung and M. Kritter, "Multimedia Watermarking Technologies", Proceedings of IEEE, Vol. 87, No. 7, pp. 1079-1107, July 1999).

In the drift compensating system described in the technical document, there is a problem that DCT coefficients of all image blocks are altered to watermark all the image blocks. In the method, because a motion compensating process is required for the drift compensation, there is another problem of the large amount of computing.

SUMMARY OF THE INVENTION

An object of the invention is to provide the digital watermarking system and the drift compensating system which can perform the DCT coefficient operation and the drift compensation in order to embed watermark data with the small amount of computing.

In order to achieve the object, the first feature of the present invention resides in that a digital watermarking system comprises means for selecting a block from MPEG-encoded data, means for selecting a DCT coefficient from the selected block, and means for performing alteration so that a quantization level value of the selected DCT coefficient is increased a value not lower than one.

The second feature of the present invention resides in that a drift compensating system comprises means for canceling the effect of DCT coefficient alteration performed in an nth MPEG-encoded frame (n is a positive integer) to DCT coefficients of the frames subsequent to the nth frame at the same position as the position where the digital watermark is embedded in the nth frame by referring to the operation of the nth frame.

In accordance with the invention, the watermark data is embedded in the DCT coefficient selected in the selected block, which results in an advantage that the process of embedding the watermark data can be performed with the small amount of computing.

The invention also has the advantage that the process of compensating the watermark data drift can be performed with the small amount of computing. Further, the invention has the advantage that the watermark data can be prevented from having an influence on subsequent image data and the image quality can be prevented from degrading.

BRIEF DESCRIPTION OF THE DRAWINGS

FIGS. 5A, 5B, and 5C are an explanatory view of a drift compensating process; and FIG. 6 is an explanatory view of watermarking and the drift compensating process of a B frame.

DETAILED DESCRIPTION OF THE PREFERRED EMBODIMENTS

Figure 1:
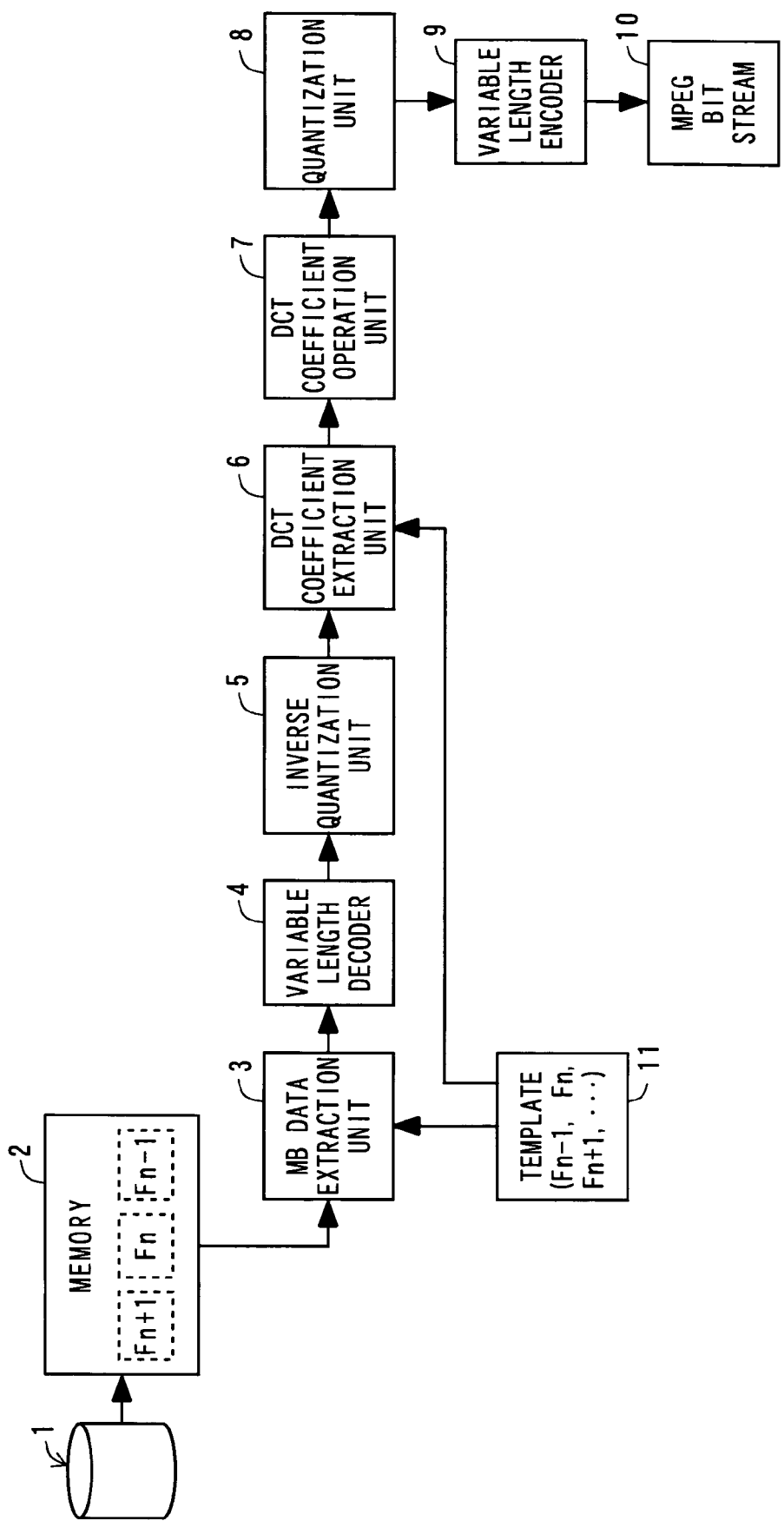
FIG. 1 is a block diagram showing a schematic configuration of an embodiment of the invention.

Referring to the accompanying drawings, the invention will be described in detail. FIG. 1 is a block diagram showing a schematic configuration of an embodiment of the invention. Although MPEG encoding is cited as an example in the following description, the invention is not limited to the MPEG encoding.

In FIG. 1, encoded picture frames, e.g. the MPEG-encoded picture frames $F_{n-1}$, $F_n$, $F_{n+1}$, ... are sequentially read out from an image file 1, and the plurality of picture frames is temporarily stored in a memory 2. An MB data extraction unit 3 extracts a macro block or block (hereinafter abbreviated as MB) into which the watermark data is embedded from the memory 2 on the basis of a direction from a template 11. The MB data extraction unit 3 also extracts MB to which the drift compensation is performed. A plurality of patterns for extracting MB is prepared in the template 11, and a different MB extraction pattern is applied in each picture frame. When the application of the MB extraction patterns is saturated, the same MB extraction patterns can be applied in a cyclical manner again. As another application of the MB extraction patterns, they also may be applied randomly.

Variable length decoding of the extracted MB data is performed by a variable length decoder 4, and inverse quantization of the extracted MB data is performed to reproduce the DCT coefficient by a inverse quantization unit 5. Then, a DCT coefficient extraction unit 6 extracts the DCT coefficient at a position into which the watermark data is embedded according to the direction of the template 11. As can be seen from the later description, a DCT coefficient operation unit 7 performs the process of embedding the watermark data or the process of compensating the drift to the extracted DCT coefficient. The data, in which the process of embedding the watermark data in the extracted DCT coefficient or the process of compensating the drift has been performed, is re-quantized by a quantization unit 8, and then variable length encoding of the data is performed by a variable length encoder 9. Finally the data is shaped and outputted by an MPEG bit stream 10.

Then, referring to a flowchart of FIG. 2, the operation of a main part of the embodiment will be described.

In Step S1, n indicating a number of the picture frame is set in n=0. In Step S2, the picture frame $F_{n+1}$ is selected from the memory 2. In Step S3, the MB data extraction unit 3 extracts the macro block MB specified by the $F_{n+1}$ template 11 from within the picture frame $F_{n+1}$. In Step S4, the DCT coefficient extraction unit 6 extracts the watermark data embedding position in MB specified by the template 11. In Step S5, the DCT coefficient operation unit 7 performs the process of embedding the watermark data in the watermark data embedding position. The process in Step S5 will be described in detail later.

In Step S6, the macro block MB is extracted from within the picture frame $F_{n+1}$ by using the $F_n$ template 11. In Step S7, it is decided whether an absolute value of a motion vector MV of the macro block MB is within 1 and the macro block MB has the DCT coefficient. When the decision is affirmative, the flow proceeds to Step S8 to compensate the drift. The drift compensating process is performed to the DCT coefficient at the same position as the position in which the watermark data is embedded in the picture frame $F_n$, and the detail will be described later. When the decision is negative in Step S7, the flow proceeds to Step S9 to decide whether the DCT coefficient exists. When the DCT coefficient exists, the drift compensating process is not performed to proceed to the next Step S11. When the DCT coefficient does not exist, the flow proceeds to Step S10 to decide that the drift compensation is not required.

The reason why the drift compensation is not performed when the decision is affirmative in Step S9 is that, when the drift compensation is performed to the DCT coefficient=0, the image quality is degraded rather than improvement of the image quality. The reason why the drift compensation is not required when the decision is negative in Step S9 is that, when the DCT coefficient exists and the absolute value of the motion vector MV is not lower than 1, the image is largely moved, therefore it is thought that watermarking the antecedent picture frame has a small negative effect on the subsequent picture frames.

In Step S11, it is decided whether the drift compensation of the picture frame $F_{n-1}$ is already performed. When the drift compensation is already performed, the flow proceeds to Step S17. When the drift compensation is not performed yet, the flow proceeds to Step S12. This judgment may be performed by examining a list which records whether or not the drift compensation is performed. In Step S12, the macro block MB is extracted from within the picture frame $F_{n+1}$ by using the $F_{n-1}$ template 11. Then, in Step S13, it is decided whether the absolute value of the motion vector MV of the extracted macro block MB is within 1 and the extracted macro block MB has the DCT coefficient. When the decision is affirmative in Step S13, the flow proceeds to Step S14 to perform the drift compensation. The drift compensating process in Step S14 is performed to the DCT coefficient at the same position as the position in which the watermark data is embedded in the picture frame $F_{n-1}$, and the detail will be described later. When the decision is negative in Step S13, the flow proceeds to Step S15 to decide whether the DCT coefficient exists. When the DCT coefficient exists, the drift compensating process is not performed to proceed to the next Step S17. When the DCT coefficient does not exist, the flow proceeds to Step S16 to decide that the drift compensation is not required.

The reason why the drift compensation is performed when the absolute value of the motion vector MV (absolute value of congruent vector of vector sum) is within 1 and the macro block MB has the DCT coefficient as shown in Step S7 or Step S13 is that the influence of the watermarking tends to accumulate in the MB data in which the motion is absent (MV=0) or small and a high frequency component is small.

In Step S17, it is decided whether the processes for all the picture frames are ended. When the decision is negative in Step S17, the flow proceeds to Step S18 to add 1 to the number n. Then, the flow returns to Step S2 to repeat the above-described processes. When the decision is affirmative in Step S17, the series of the processes is ended. The flowchart of FIG. 2 only shows an example of the operation, and the invention is not limited to the operation shown in FIG. 2.

Figure 2:
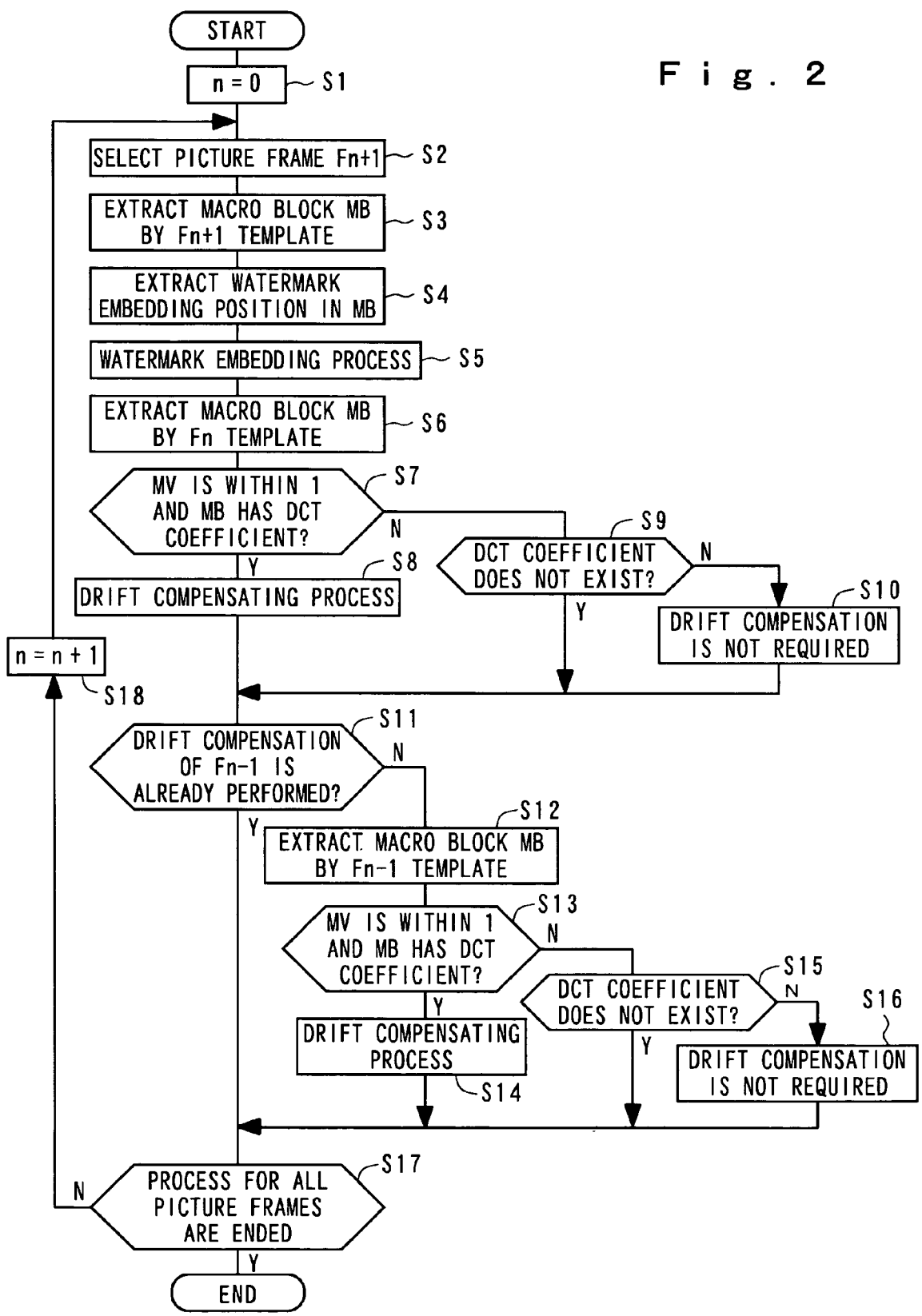
FIG. 2 is a flowchart showing operation of a main part of the embodiment of the invention.
Figure 3:
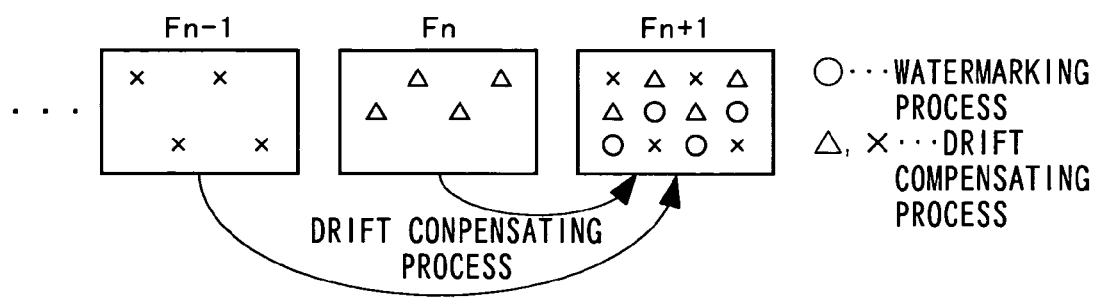
FIG. 3 is an explanatory view simply showing a main part in processes of the flowchart shown in FIG. 2.

FIG. 3 is an explanatory view simply showing the processes of the flowchart shown in FIG. 2. In the picture frame $F_{n+1}$ of interest, the watermarking process ○ and the process Δ and X of compensating the drift to the watermarking of the antecedent picture frame $F_n$ and the watermarking of the second antecedent picture frame $F_{n-1}$, respectively, are performed. The drift compensation to the watermarking of the picture frame $F_n$ is performed in the picture frame $F_{n+1}$. When the drift compensation to the watermarking of the picture frame $F_{n-1}$ is performed in the picture frame $F_n$, the drift compensation has been completed. When the drift compensation to the watermarking of the picture frame $F_{n-1}$ is not performed in the picture frame $F_n$, the drift compensation to the watermarking of the picture frame $F_{n-1}$ is performed in the picture frame $F_{n+1}$. When the drift compensation to the watermarking of the picture frame $F_{n-1}$ is not performed in the picture frame $F_{n+1}$, the drift compensation to the watermarking of the picture frame $F_{n-1}$ is performed in a next picture frame $F_{n+2}$.

Then, the process of embedding the watermark data in Step S5 will be described in detail. When a quantization step size is Δ in the DCT coefficient value which is of an embedded subject, Δ is added to the DCT coefficient value of the embedded subject so that the absolute value is increased. Namely, a quantization level value of the selected DCT coefficient is altered so that it is increased a value not lower than one. Alternatively, when the quantization step size applied in case a change or conversion result is encoded at lower bit rate is Δ', Δ' is added to the DCT coefficient value of the embedded subject so that the absolute value is increased.

Figure 4:
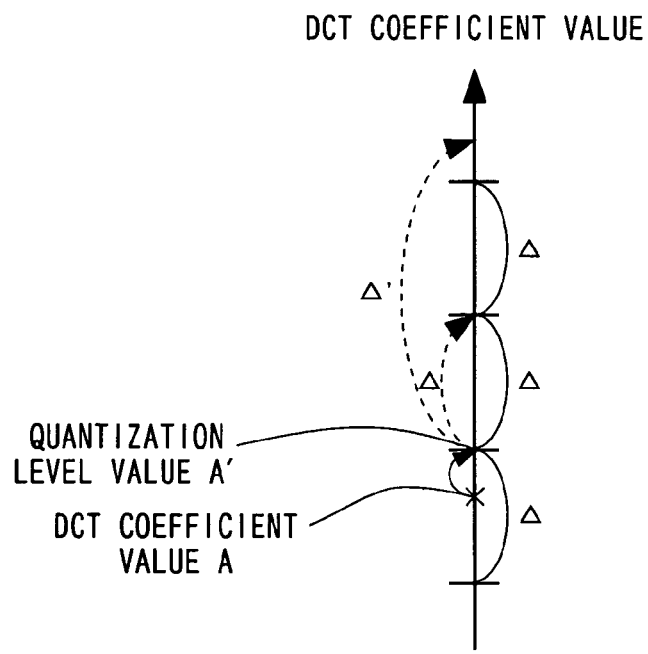
FIG. 4 is an explanatory view of a process embedding watermark data.

For example, as shown in FIG. 4, when the DCT coefficient value of the embedded subject is A, Δ or Δ' is added to the absolute value of a quantization level value A' of the DCT coefficient value A. That "the quantization step size applied in case a change or conversion result is encoded at lower bit rate is Δ'" can be thought, e.g. in the encoding process when high-bit-rate image data for optical fiber communication is converted into low-bit-rate image data for telephone line.

Then, the drift compensating processes in Step S8 and Step S14 will be described referring to FIG. 5. The drift compensating process in encoding an I (picture) frame and a P (picture) frame will first be described below.

When the watermark data is embedded in the picture frame $F_n$, the macro block MB of the next picture frame $F_{n+1}$ corresponding to the same position as the macro block MB in which the watermark data is embedded in the picture frame $F_n$ is observed. When the absolute value of the motion vector of the macro block MB is 0 (no motion) or 1, i.e. when the absolute value of the motion vector is within 1 and the macro block MB has the DCT coefficient, the inverse process to the DCT coefficient operation performed when the watermark data is embedded is performed. Assuming that the DCT coefficient before embedding the watermark data in the picture frame $F_n$ is a, the watermark data is w, the DCT coefficient of the picture frame $F_{n+1}$ at the same position as the picture frame $F_n$ is b, and quantization process to which the DCT coefficient of the picture frame $F_n$ is applied is Q( ), the amount of shift d of the DCT coefficient generated in the picture frame $F_n$ is expressed by the following equation (see FIG. 5A). It is preferable that d is stored in storage means (not shown).

$$d=Q(a+w)-a$$

Thus, in order to perform the drift compensation of the watermarking in the picture frame $F_{n+1}$, it is possible that DCT coefficient b' is set by subtracting the amount of shift d from the DCT coefficient b of the same position (see FIG. 5B).

However, since the quantization process is performed to the DCT coefficient b' after the compensation, Q(b') is not always equal to b'. In this case, since Q( ) takes discrete values {Q1, Q2, . . . , Qi, . . . }, Qi closest to b' is selected and Qi is used as the quantization value after the compensation (see FIG. 5C). Namely, in the picture frame $F_{n+1}$, the inverse operation to the DCT coefficient operation performed to the antecedent picture frame is performed by referring to the operation of the antecedent picture frame.

When the picture frame $F_{n+1}$ is the macro block MB in which the DCT coefficient does not exist, the drift compensation similar to the picture frame $F_{n+1}$ is performed in the subsequent picture frame $F_{n+2}$. However, when the total absolute value of the motion vector exceeds 1, the drift compensation is not performed because the influence of the watermarking is relaxed.

In the case where the B (picture) frame is included, the process will be described below. In this case, as shown in FIG. 6, the I or P picture in which the watermark data is embedded has the influence not only on continuous picture frame but also on the B frame which is positioned apart from the I or P picture and refers to the I or P picture, so that the B frame also becomes the object of the drift compensation. However, when the watermark data is embedded in the B frame, the drift compensation is not required because the other pictures do not refer to the B frame.

As described above, in accordance with the invention, only the limited numbers of pieces of MB data are extracted by the template to embed the watermark data therein. Further, the drift compensation is performed to the data at the same position as the position where the watermark data is embedded in the frames subsequent to the frame in which the watermark data is embedded. Therefore, the watermarking in which the amount of computing is small and the degradation in image quality is little can be realized.

What is claimed is:

1. A system for compensating drift of a digital watermark, comprising:
    means for performing an operation for canceling the effect of a DCT coefficient alteration performed in an nth MPEG-encoded frame, n is a positive integer, to DCT coefficients of frames subsequent to the nth frame at a same position as a position where the digital watermark is embedded in the nth frame by referring to the alteration operation of the nth frame,
    wherein the digital watermark is embedded by a digital watermarking system comprising means for selecting a block from MPEG-encoded data;
    means for selecting a DCT coefficient from the selected block; and
    means for performing alteration so that a quantization level value of the selected DCT coefficient is increased by a value not lower than one.

2. A drift compensating system according to claim 1, wherein the drift compensation is performed when an absolute value of a motion vector of the frame subsequent to the nth frame is within 1.

3. A drift compensating system according to claim 2, further comprising;
    means for storing a difference "d" between a quantization level value "Q" after embedding a watermark and a DCT coefficient value "a" before embedding the watermark, and
    means for subtracting the difference "d" from an inverse quantization value of the same position of the frame subsequent to the nth frame.

4. A drift compensating system according to claim 3, wherein a DCT coefficient "b" obtained by the subtracting means and a quantization level value "Q" closest to the DCT coefficient "b" are selected from among the available quantization level values.

5. A system, comprising:
    a digital watermarking system comprising
    means for selecting a block from an nth, n is a positive integer, frame of MPEG-encoded data;
    means for selecting a DCT coefficient from the selected block; and
    means for embedding a digital watermark in the selected block by increasing a quantization level value of the selected DCT coefficient by a value not lower than one; and
    means for compensating drift to a DCT coefficient in a frame subsequent to the nth frame by referring to an operation of the nth frame, the DCT coefficient in the subsequent frame being located at a same position as a position at which the digital watermark is embedded in the nth frame,
    wherein the means for compensating drift to the DCT coefficient in the frame subsequent to the nth frame performs an operation for canceling the effect of the drift performed on the DT coefficient in the nth frame when embedding the digital watermark.

6. The system as recited in claim 5, wherein the operation for canceling comprises
    calculating a difference obtained by subtracting the selected DCT coefficient before embedding the digital watermark from a quantized value of the selected DCT coefficient after embedding the watermark, and
    subtracting the difference from the DCT coefficient in the frame subsequent to the nth frame.

* * * * *